United States Patent [19]
Heinz, Sr.

[11] Patent Number: 5,812,764
[45] Date of Patent: Sep. 22, 1998

[54] PASSWORD MANAGEMENT SYSTEM OVER A COMMUNICATIONS NETWORK

[75] Inventor: Michael William Heinz, Sr., Phenixville, Pa.

[73] Assignee: International Business Machines, Armonk, N.Y.

[21] Appl. No.: 791,742

[22] Filed: Jan. 30, 1997

[51] Int. Cl.⁶ .................................................. C06F 11/00
[52] U.S. Cl. ........................................................ 395/188.01
[58] Field of Search ......................... 395/188.01, 187.01, 395/186; 380/25, 23

[56] References Cited

U.S. PATENT DOCUMENTS

| | | |
|---|---|---|
| 4,429,180 | 1/1984 | Unkenholz . |
| 5,293,576 | 3/1994 | Mihm, Jr. et al. . |
| 5,335,280 | 8/1994 | Vobach . |
| 5,434,918 | 7/1995 | Kung et al. ................................ 380/25 |
| 5,491,752 | 2/1996 | Kaufman et al. . |
| 5,495,533 | 2/1996 | Linehan et al. ............................ 380/21 |
| 5,542,046 | 7/1996 | Carlson et al. . |
| 5,548,646 | 8/1996 | Aziz et al. . |
| 5,555,309 | 9/1996 | Kruys . |
| 5,557,678 | 9/1996 | Gancsan . |
| 5,563,947 | 10/1996 | Kikinis . |
| 5,581,700 | 12/1996 | Witte ................................... 395/188.01 |
| 5,606,315 | 2/1997 | Gaskins .............................. 340/825.34 |
| 5,606,663 | 2/1997 | Kadooka ............................ 395/188.01 |
| 5,721,779 | 2/1998 | Funk ......................................... 380/23 |

*Primary Examiner*—Robert W. Beausoliel, Jr.
*Assistant Examiner*—Scott T. Baderman
*Attorney, Agent, or Firm*—Hunton & Williams

[57] ABSTRACT

The present invention is a system and method for securing communications over a network. A list of passwords is pseudorandomly generated and securely provided to at least two communicators. Upon initial communication between communicating parties, a password is pseudorandomly selected by one communicator and indirectly communicated to at least one other communicator through the use of an identifier. Subsequent messages between the communicators may be encrypted using the selected password. After an interval of time, a new password is pseudorandomly selected and used.

41 Claims, 5 Drawing Sheets

PASSWORD MANAGEMENT SYSTEM OVER A COMMUNICATIONS NETWORK

BACKGROUND OF THE INVENTION

1. Field of the Invention

The present invention relates generally to a communications security system and more particularly relates to a system that uses password management to provide secure communications over a network.

2. Description of the Background

Over the past few years, there has been an explosive increase in the use of wide area networks (WANs), particularly intranets and the Internet, for data transfer, research, recreation and other communication activities. Businesses, educational institutions, governments and individuals often use electronic mail (e-mail) as a means for communicating over such networks. In particular, businesses are increasingly using e-mail for mission critical functions, such as high-level commercial negotiations and transactions. Along with this increased and highly sensitive usage is a growing demand for electronic communications to be both private and authentic.

In the past, when business e-mail was routed within internal networks, the physical security of that network typically ensured that e-mail messages were secure. Now, however, the increasing dependence on the Internet for various types of communication, including for use as a low-cost e-mail WAN, makes additional security measures more important. Since physically securing the Internet is not a feasible option, e-mail users often turn to various forms of encryption to provide such security.

Public key encryption (PKE) is typically used for securing communications over the Internet. PKE uses two different but related keys: a public key and a private key. Each communicator has a public key, which is distributed to a select group of people or is made available to the public. Each communicator also has a private key, which is kept secret. If a sending party needs to send an encrypted message to a receiving party, the sending party looks up the receiving party's public key in either a public or personal directory. The sending party then uses the public key to encrypt the message. The sending party sends the message and the receiving party decrypts it using his private key. The encrypted message preferably can be decoded only by using the private key. Assuming the receiving party is the only one possessing the private key, and that the encoding technique cannot be broken, then the receiving party is the only one who can decrypt and read the message.

PKE allows anyone with access to the receiving party's public key to send the receiving party an encrypted message. Public keys may be freely distributed throughout an electronic community, thereby allowing strangers to communicate with each other. For example, a public key may be distributed by posting the key on public bulletin boards, passing the key from user to user, publishing the key in electronic or paper publications, or listing the key in a public key server, which is a directory of encryption users' names and their corresponding public keys.

PKE uses a trap door function to provide its security. A trap door function is one that is easy to calculate in one direction yet difficult to calculate in the reverse direction (i.e., difficult to invert). The trap door function employed in PKE is the multiplication and factoring of positive integers. While it is simple to multiply positive integers (i.e., perform a function in one direction), it is extremely difficult to factor a positive integer (i.e., perform the inverse function), particularly a very large integer, into a product of prime numbers. Despite the difficulty of solving the PKE trap door function, an attacker may attempt to discover the content of the encrypted message or the private key through cryptanalysis, or very high level mathematical computations. Upon discovery of an algorithm that factors integers in reasonable time, the PKE algorithms will be rendered virtually useless for secure communications. Because there has been a concentrated effort in recent years to solve this problem, it is foreseeable that the security of public key schemes could be compromised in the near future. Indeed, there has already been at least one reported instance where an individual cracked an encrypted session.

PKE, and the protocols based on it, suffer from many additional shortcomings. For example, PKE revolves around the idea of letting strangers communicate in a secure manner. However, often is not desired to allow strangers to communicate. In addition, one pair of keys enables communications in only one direction. Two additional keys are necessary to implement two-way communication. Furthermore, the speed of operation of an electronic messaging system suffers from significant lag time when PKE is used because of the complexity of the mathematical algorithms involved.

Existing password management schemes that are used in conjunction with symmetric (i.e., single key) encryption techniques are similarly problematic for network communications. Typically, passwords are employed as a means for authenticating commands prior to carrying out the instructions communicated by the commands, and not as a means for ongoing approximately real-time communication over the Internet. Such systems do not address the complexities of today's world of electronic messaging. Moreover, the passwords are often susceptible to brute force attack. For example, when users are allowed to select their own passwords, they tend to choose passwords that are easily remembered, and often can be easily guessed. Additionally, because the same password is used for an extensive period of time, the window of opportunity for successful decoding is similarly lengthy.

Because of these and other weaknesses, security experts recommend changing passwords frequently. This magnifies the problems associated with easily-guessed passwords because the burden of constantly changing passwords makes it more likely that the user will choose simple ones. Changing passwords also increases the risk that passwords might be intercepted by an eavesdropper. Since both sides of a symmetric encryption system must agree on the password prior to its use, frequently changing passwords increases the number of opportunities for eavesdroppers to overhear what passwords are chosen.

SUMMARY OF THE INVENTION

It is therefore an object of the present invention to overcome these and other drawbacks of the prior art and to provide a password management system that pseudorandomly generates complex passwords and changes the passwords frequently.

It is another object of the invention to provide a password management system for a communications network in which the identification and selection of passwords does not require the passwords themselves to pass over the communications network.

It is another object of the invention to facilitate approximately real-time continuous communications over a network such as an institutional intranet or the Internet.

It is another object of the invention to manage a password system for use with the symmetric encryption of communications over a network.

It is another object of the invention to provide a challenge and response authentication system using pseudorandomly generated and selected passwords.

One embodiment of the invention provides a password management system for communications between at least a first party and a second party. Using a cryptographically secure algorithm, a password list comprised of a large number of passwords is pseudorandomly generated. The password list is provided to at least the first party and the second party. The first party then pseudorandomly selects one of the passwords from the password list. Rather than communicating the actual password to the second party, the first party provides the second party with an identifier of the password. The second party finds the password on its password list corresponding to the identifier. Subsequent communications between the parties are encrypted with the selected password. After an interval of time, a new password is pseudorandomly selected and used to encrypt the communications.

Another embodiment of the invention manages passwords for communications among a plurality of users. The parties may be divided into groups of two, with each group having its own password list. Alternatively, a password list may be shared among a plurality of users in a peer-to-peer mode.

Another embodiment of the invention provides a challenge and response authentication system that uses a password management scheme without encryption. A first party randomly chooses a password and sends an identifier of that password to a second party. The second party looks up the password in its copy of the password list and sends the text of that password to the first party. The first party confirms that the second party used the correct password and then allows communications to begin.

Other objects, advantages and embodiments of the invention are set forth in part in the description which follows, and in part will be apparent from this description or from practice of the invention.

DETAILED DESCRIPTION OF THE INVENTION

Figure 1:
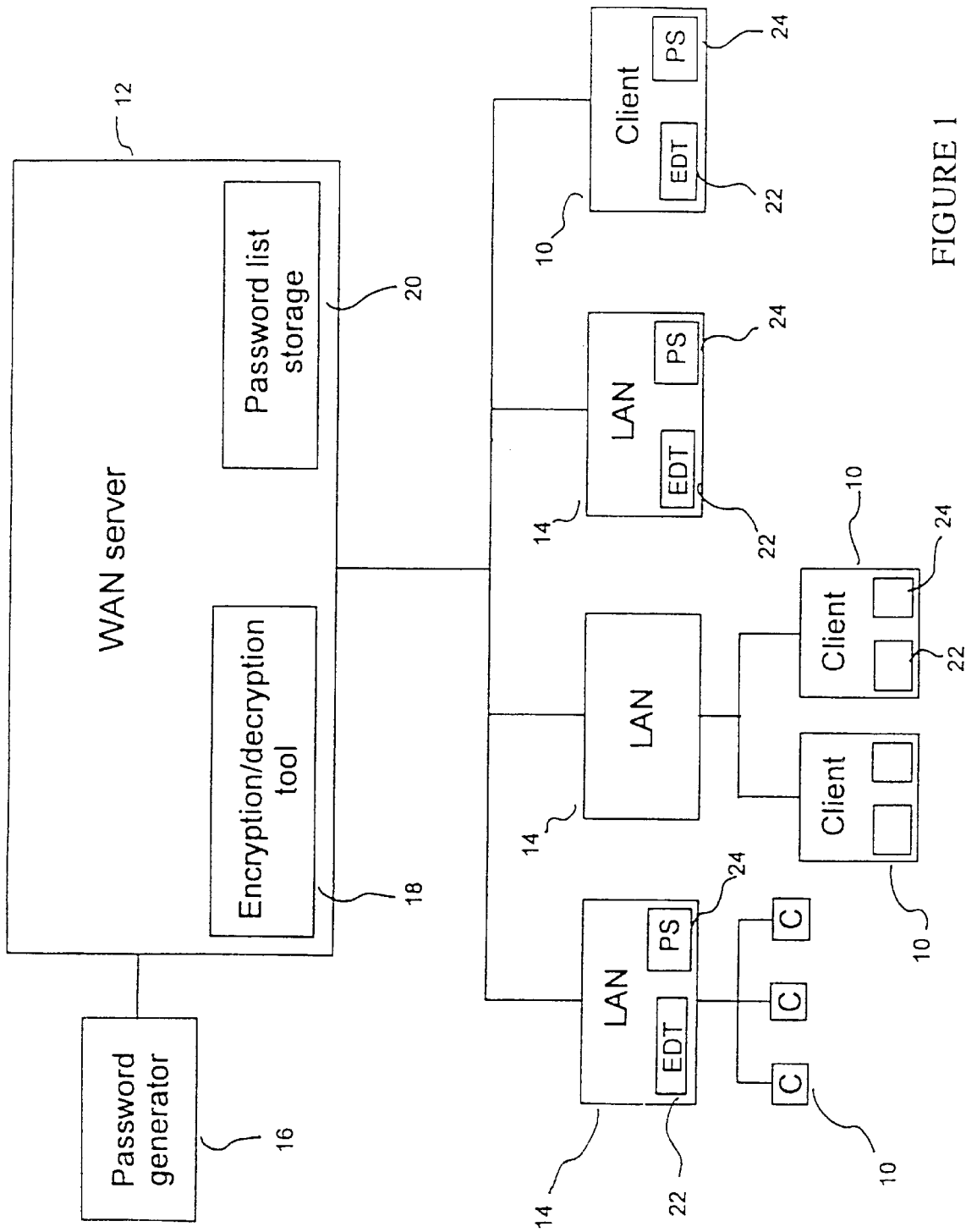
FIG. 1 is a diagram of a preferred embodiment of the invention.

A preferred embodiment of the present invention is illustrated in FIG. 1. A plurality of clients 10 are connected to an e-mail WAN server 12. The WAN may be an intranet, the Internet or other network. Clients 10 may be linked to the WAN server 12 directly or through a local area network (LAN) 14. LANs 14 connected to the WAN server 12 are also clients of the WAN server.

A password generator 16 is connected to the e-mail WAN server 12. The password generator 16 generates a list of passwords for clients that are in communication with the WAN server 12. The WAN server 12 preferably has an encryption/decryption tool 18 for encoding and decoding messages that are secured using a password retrieved from a password list. The WAN server 12 also has a password list storage 20 that stores the password lists generated by the password generator 16. Each client has an encryption/decryption tool 22 and password storage 24 or has access to an encryption/decryption tool 22 and password storage 24 located on the LAN 14 to which it is connected. LANs having a plurality of clients may maintain in the password storage 24 password lists for each client.

While only a limited number of components are illustrated in FIG. 1, it is readily understood by those skilled in the art that a plurality the components shown may be linked within the network, and that the communication network shown may be connected to other communication networks.

Figure 2:
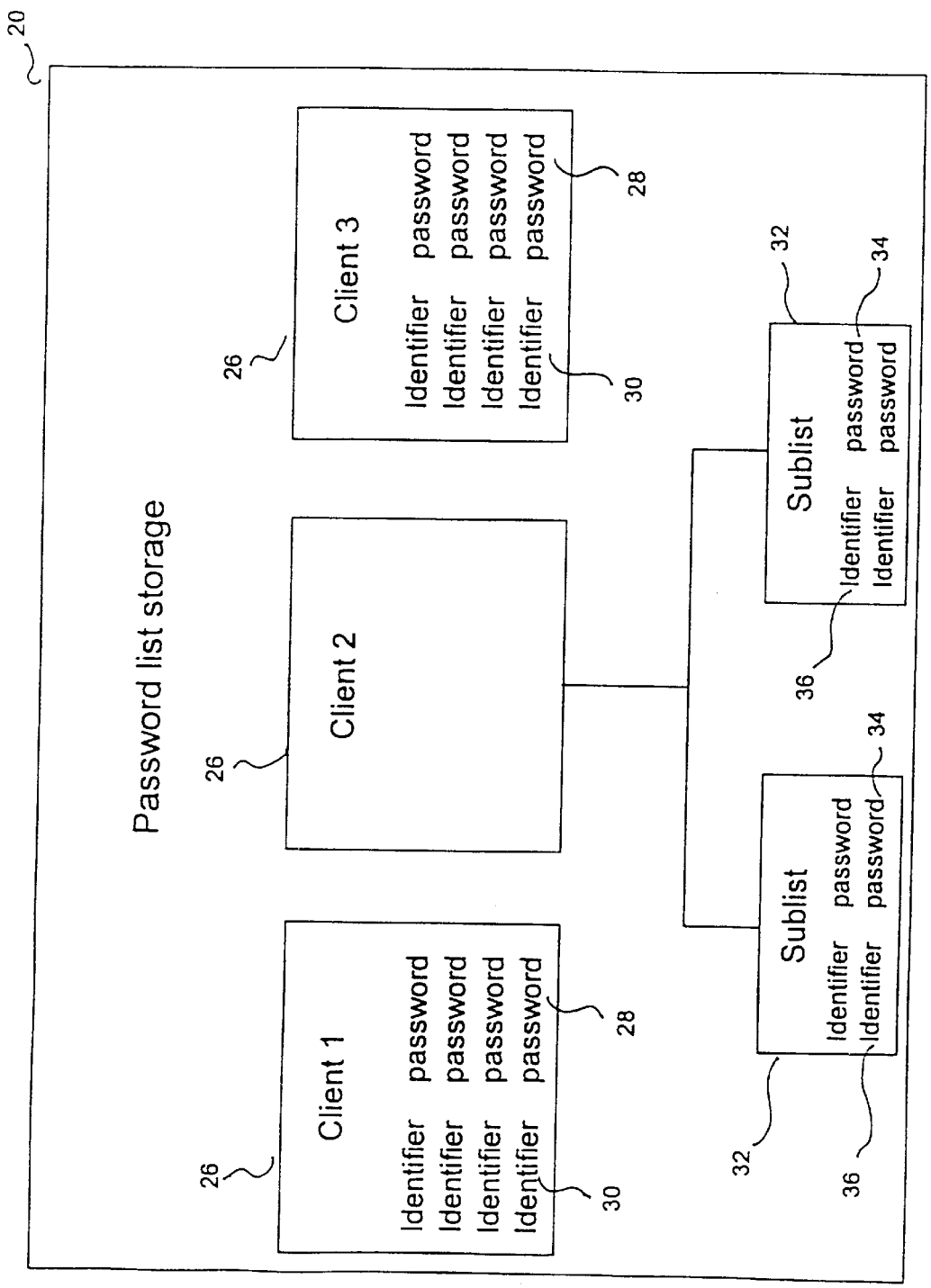
FIG. 2 is the password list storage of the WAN server according to a preferred embodiment of the invention.

The password list storage 20 of the WAN server 12 is illustrated in further detail in FIG. 2. Passwords lists 26 of a plurality of clients are stored in a text file, database or other similar storage mechanism. Each password list 26 is comprised of a plurality of passwords 28 and identifiers 30 corresponding to each password. A client's password list may be divided into a plurality of sublists 32, with each sublist 32 containing a plurality of passwords 34 and their corresponding identifiers 36.

The contents of each sublist 32 may vary throughout operation of the password management system. For example, upon initiation of communications, one sublist may contain all of the passwords for that client while another sublist may be empty. Used passwords originally retrieved from the first sublist may be transferred to the second sublist upon expiration of use. Eventually, the first sublist is emptied and the second sublist contains all of the used passwords. Other criteria may be used for determining which passwords are placed in which sublist and for transferring contents from one sublist to another. Also, any number of sublists may be created for each client.

Figure 3:
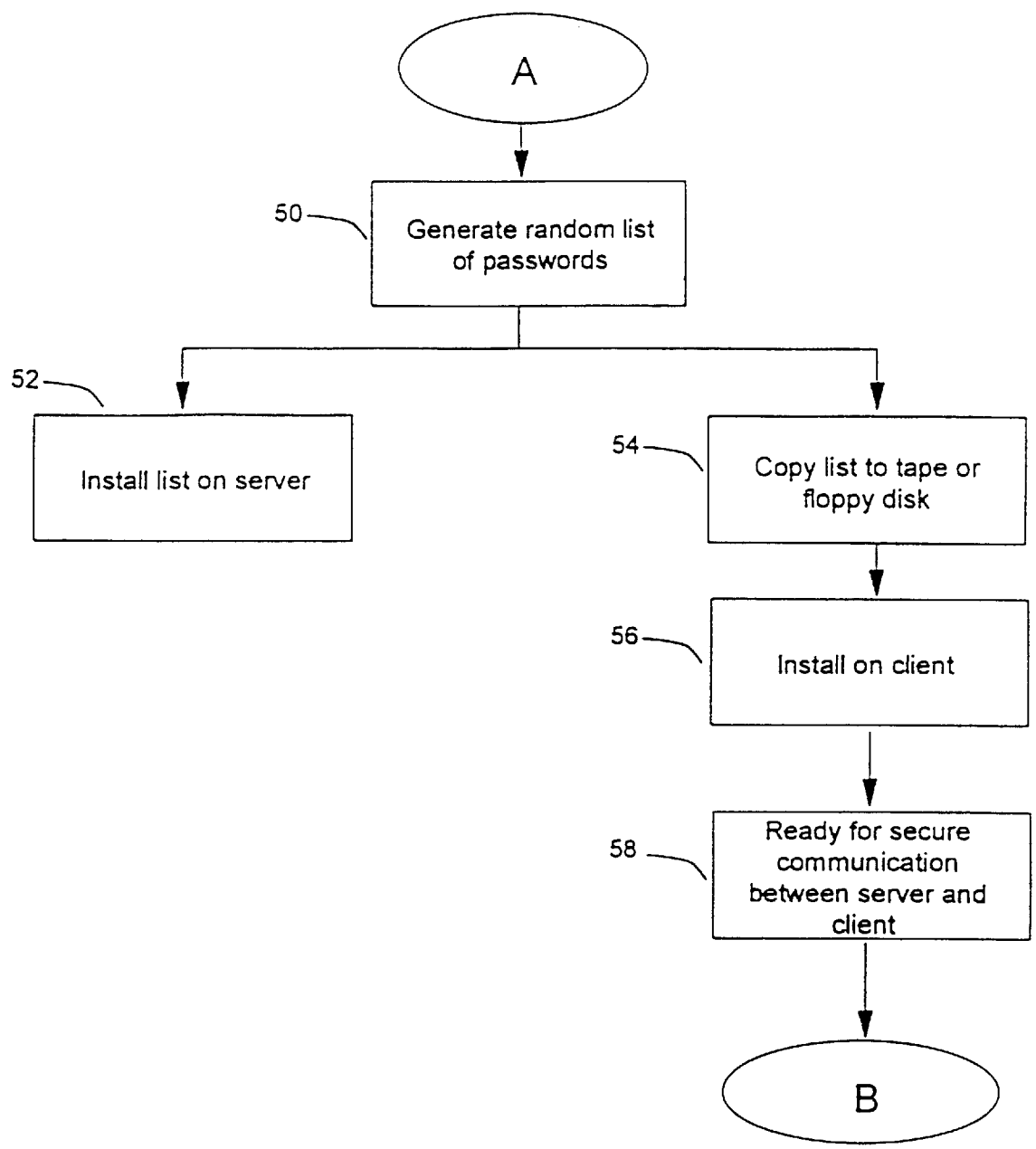
FIG. 3 is a flow chart diagram depicting the creation and installation of a password list according to a preferred embodiment of the present invention.

Password generation and retention according to a preferred embodiment of the invention is shown in FIG. 3. The WAN server administrator (e.g., e-mail server or backbone administrator) generates a pseudorandom list of passwords using a cryptographically secure pseudorandom number algorithm 50. The cryptographically secure pseudorandom algorithm preferably generates passwords so that there is no pattern or relationship between the values of password #1 and password #2, and so forth. For example, one means for generating a set of pseudorandom passwords is to ask the administrator to type in a plurality of (e.g., twenty or thirty) letters at random. The password generator algorithm then measures the number of microseconds that elapses between each keypass the administrator makes. This list of times becomes the "initial password." The password generator application then takes a large file (e.g., a company phone book, the binary image of the password generator application itself, an electronic copy of a document, or the like) and encrypts that file with the initial password. The initial password is then discarded and the new encrypted data file is broken up into a list of passwords. In this way, the passwords in the list are unpredictable and have no easily derivable relationship between each other. Other means that similarly generate passwords that are unpredictable and have no easily derivable relationship between each other may be used.

For each preferably secure client, the generation algorithm pseudorandomly creates a large list of passwords that are assigned to that client. The backbone administrator may create a database that stores a plurality of password lists for a plurality of clients. The length of each password depends on the encryption scheme that will be used to encrypt the communication. Preferably, each password is at least 56 bits in length. If the triple-DES encryption standard is used, each password is preferably at least 112 bits in length. The passwords generated by the algorithm preferably are a collection of printable and unprintable characters. That is, passwords may include control characters and other bit patterns that cannot be easily replicated by a user at a keyboard. The password generation program creates a long list of passwords. In a preferred embodiment, over 16,000 passwords are generated. The length of the list may vary depending on the needs of the communicators.

The list of passwords is exchanged between the server and the client through a secure link before communication takes place. Preferably, the password list is transported via courier or similar means of certified mail. However, if electronic distribution is used, the password list may be encrypted in some way and delivered in that manner. For example, the WAN server administrator may use a public domain software package such as Pretty Good Privacy (PGP) to encrypt the password list with a public key, allowing it to be sent over a public network, such as the Internet, to the administrator of the client system. Because PGP is only used for this one exchange, its associated performance problems may be overlooked.

A copy of the list is provided to the server 52. This list should be secure from intruders. The list is also copied to a tape, floppy disk or other secure mechanism 54 and then provided to the client 56. At this point, a security mechanism is in place for communications between the server and the client 58.

Figure 4:
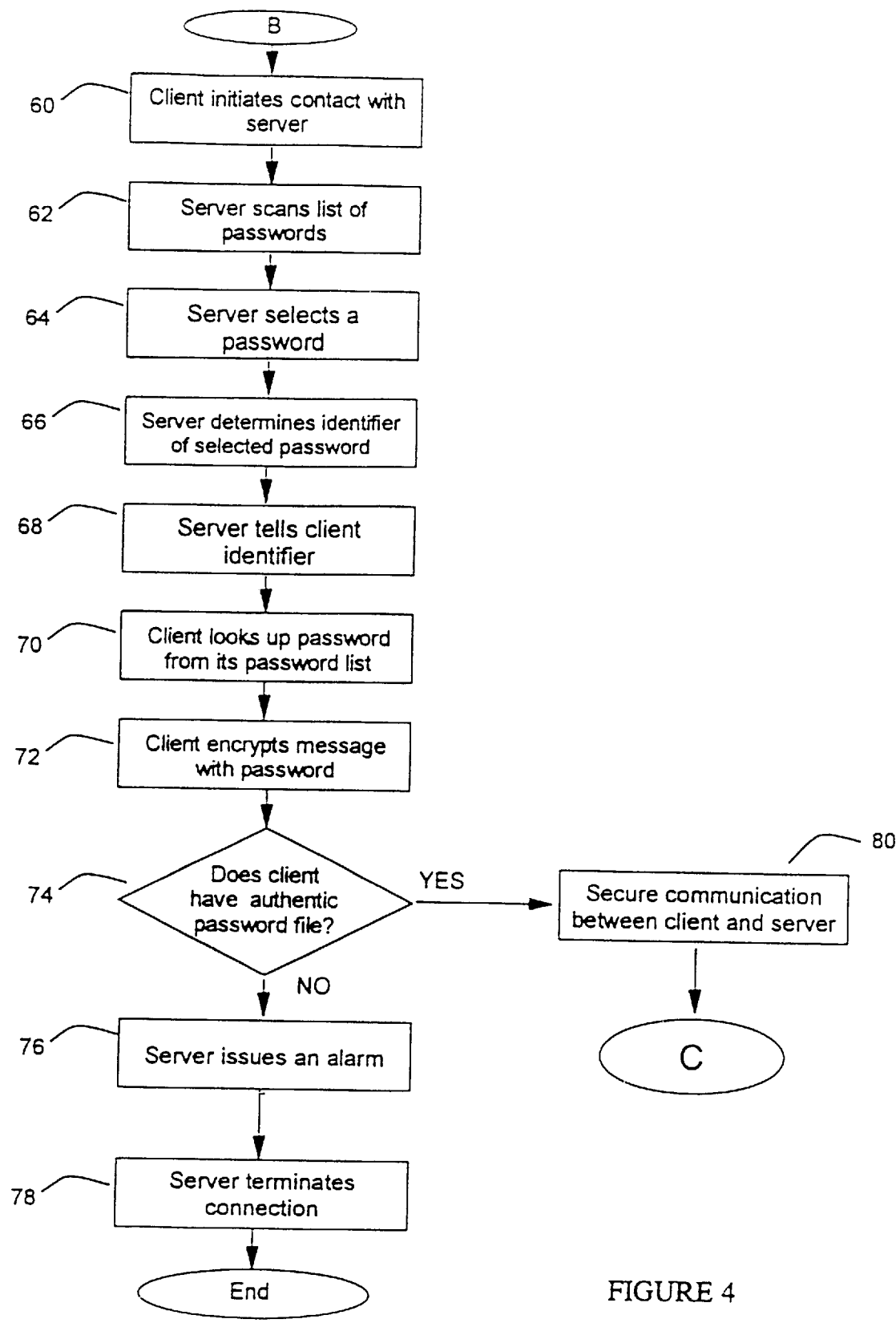
FIG. 4 is a flow chart diagram depicting a secure communication according to practice of a preferred embodiment of the present invention.

The password challenge stage occurs whenever a new password is selected. When the client first contacts the server, the initial connection is in unencrypted form (i.e., "in the clear"). The server, if it recognizes the client, pseudorandomly selects a password from the list of passwords for that client. As shown in FIG. 4, when the client initiates a connection with the server 60, the server scans the list of passwords for that client 62. The server picks a password 64 by pseudorandomly choosing a number n, where n is a number between one and the number of passwords in the password file. The number n may be chosen by a random number generator built into the host operating system. If desired, other means for pseudorandomly choosing n may be used, such as taking the current time of day, encrypting it, and treating the resulting encrypted data as if it were a random number.

The pseudorandom number is preferably the identifier of the selected password. The identifier may be something other than a number or plurality of numbers if so desired. For example, the identifier may be a character, a character string, an alphanumeric string or similar type of identification. After determining the identifier of the selected password 66, the server tells the client the identifier (e.g., identification number) of that password, but not the password itself 68. The client looks in its copy of the password file and extracts the password corresponding to such identifier 70. For example, if the number n is the password identifier, the client extracts password number n from its password file. The client immediately begins encrypting communications with that password 72. Any symmetric encryption technique considered sufficiently secure is employed. Recommended techniques include RC4, DES, triple-DES (for enhanced security) or any similar encryption technique that may be developed.

Based on the encrypted communication sent from the client, the server determines whether the client has the authentic password file 74. The server decrypts the communication using the password the server had selected. If the decoded message is understandable, then the server will know that the client selected the correct password and that the client has the authentic password file. Further communications between the server and the client will remain secure through use of the selected password 80. If the server cannot successfully decrypt the message from the client, it assumes that the client is an imposter, issues an alarm 76 and terminates the connection 78.

Figure 5:
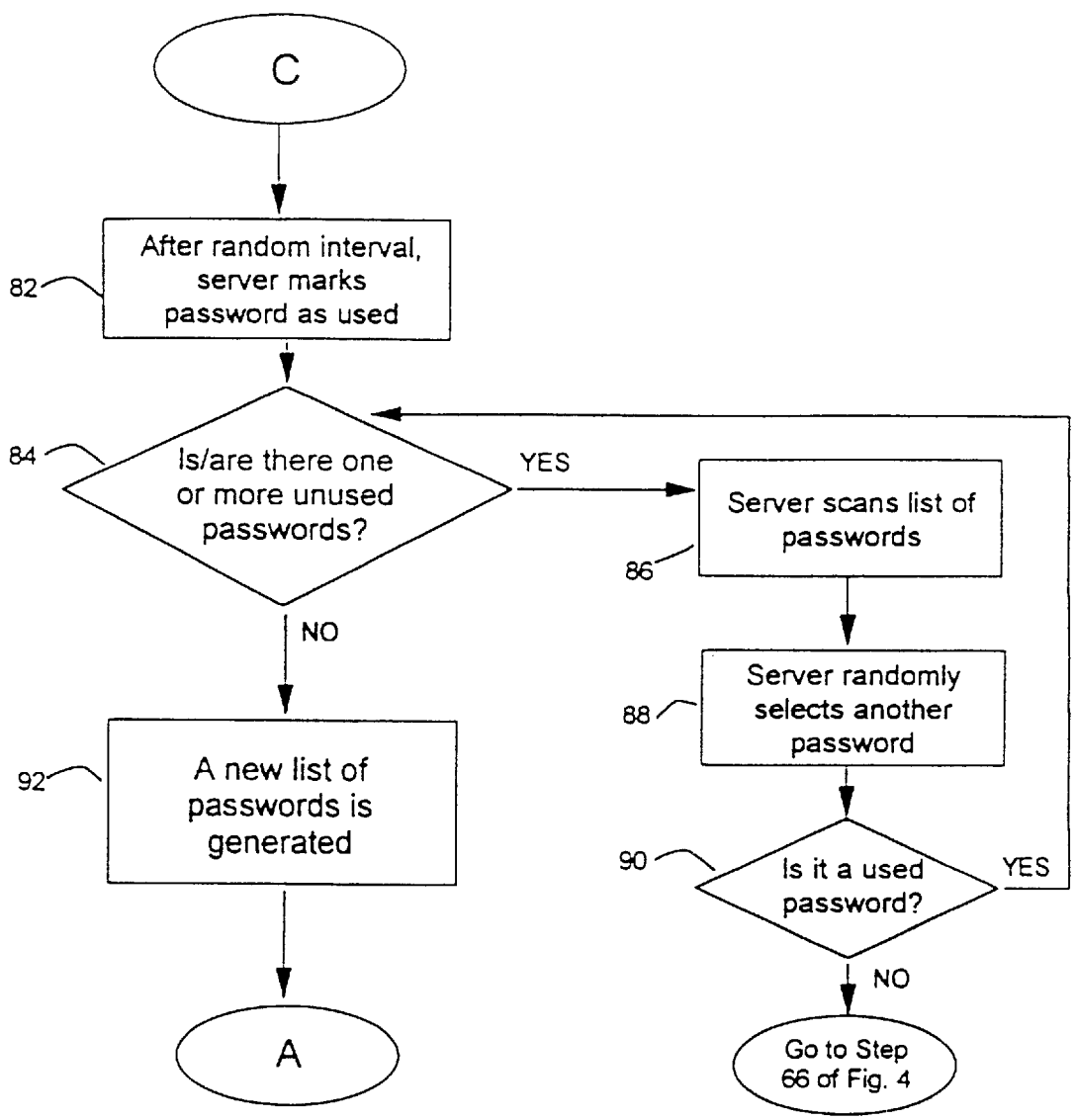
FIG. 5 is a flow chart diagram depicting the changing of a password according to a preferred embodiment of the present invention.

If a secure communication has been established, then after an interval of time, the server marks the password as "used" 82 (FIG. 5) and issues a new password challenge. The password that is marked "used" is preferably never used again. However, password reuse can be permitted if so desired. The server then determines whether there is another password available (e.g., one that has not been used) 84. If there are one or more available passwords, the server pseudorandomly picks a new password. The server scans its password list for that particular client 86 and pseudorandomly selects a password 88. The server determines whether the password is available 90. If it is not available (e.g., the password has already been used), the server repeats steps 84, 86 and 88 until an available password is selected or until the list is exhausted. Upon selecting an available password, the process of securing the communication, starting with step 66 of FIG. 4, is repeated.

The password is changed at frequent pseudorandom intervals. The length of the interval may depend on the nature and frequency of the communication between the two parties. A password that is initially selected is used for a first period of time. After expiration of the first period of time, the password is changed. The next selected password is used for a second period of time. The first period of time may be less than, equal to, or greater than the second period of time. Subsequent intervals of time for use of subsequently selected passwords may similarly be less than, equal to, or greater than the previous period of use. In a preferred embodiment, the password is changed an average of once a day, with each password being used between 12 and 36 hours.

In the embodiment where passwords are not reused, if the server determines that all the passwords are used (i.e., the list has been exhausted), the administrator generates a new list of passwords 92 by repeating the steps described with reference to FIG. 3. A mechanism may be provided for alerting the server (or, if desired, all users) when the password list is near exhaustion, such as when there are five or ten remaining unused passwords. Other criteria may also be used for determining when the users should be alerted. This provides the server with advanced warning of the need to generate a new password list.

Generating a new list of passwords need not be a frequent event. For example, if a new password is selected on an average of eight hours, and the list contains 16384 passwords, then 5461 days (i.e., 14 years) will elapse before the password file is exhausted. If so desired, a new list of passwords may be generated at a time prior to exhaustion of a previously used list. If passwords are used more than once, then the password list may be replaced with a new list at a time that is based on criteria other than exhaustion of the list. Also, the users need not be limited to predetermined criteria for replacing the password list.

In another embodiment of the invention, the password list is divided into a plurality of sublists. One sublist may contain available passwords and another sublist may contain unavailable passwords. For example, when a password is used, it may be removed from a first sublist and moved to a second sublist. Thus, a new password retrieved from the first sublist is preferably guaranteed to be available. Criteria other than availability (or nonuse) may be used to divide the list of passwords into sublists. If desired, selection of a password may be made from any sub list, not just a first sublist. Also if desired, a password may reside in more than one sublist.

In another embodiment of the invention, the passwords are discarded after they are used. This prevents repeated use of a password. Also, when passwords are discarded after use, the step of determining the availability of a password is eliminated since the remaining passwords (i.e., the ones which have not been discarded) are available.

Another embodiment of the invention manages communications among a plurality of parties. The parties may be divided into groups of two, with each group having its own password list. For example, an e-mail server with many clients would generate and maintain a password list for each client. Clients communicate only with the server, and not with each other. The server can pass messages from one client to another client, thereby allowing clients to communicate indirectly with each other via a secure link.

In some circumstances, it may be desirable to allow parties to communicate directly with each other without a server. Several parties may share a password list in a peer-to-peer mode. In this mode, one party pseudorandomly generates the password list and the list is shared among all parties in the group. Whenever a calling party contacts a listening party, the listening party pseudorandomly chooses an available password from its list. Various criteria may be used to determine whether a password is available. In a preferred embodiment, a password is available if it has not been used. However, used passwords may be available if so desired. The listening party then tells the calling party the identifier (e.g., an identification number, character or alphanumeric string) of that password. A listening party may choose a password that the calling party has already used. The calling party either allows or rejects the used password. If it rejects the password, the calling party sends a second, in-clear message to the listening party, indicating that the password is rejected. The listening party then selects another password and communicates the corresponding identifier to the calling party. Upon pseudorandom selection of a password mutually agreeable to the parties, the password is used to encrypt the conversation. After expiration of a first interval of time, the password is changed. The next selected password is used for a second interval of time. The first interval of time may be less than, equal to, or greater than the second interval of time. Subsequent intervals of time for use of subsequently selected passwords similarly may be less than, equal to, or greater than the previous period of use.

Another embodiment of the invention provides a challenge and response authentication system. It may be used for communication among a plurality of communicators but is preferably used when a client contacts a server over a secure line such as a dial-up phone line. In such an instance, the server confirms that the client is authorized to access the server. A password management scheme is used without requiring encryption of the communications. The server and client therefore need not be equipped with the encryption/decryption tools illustrated in FIG. 1. According to this embodiment of the invention, a password generator pseudorandomly creates a large list of passwords that are assigned to the client. The length of the passwords depends on the nature and extent of the communications between the server and client. The passwords generated by the algorithm preferably are a collection of printable and unprintable characters. That is, passwords preferably include control characters and other bit patterns that cannot be easily replicated by a user at a keyboard. The password generator creates a long list of passwords, with the length of the list depending on the needs or preferences of the server or client. The list of passwords is exchanged between the server and the client through a secure link before communication takes place. Preferably, the password list is transported via courier or similar means of certified mail. However, if electronic distribution is used, the password list may be encrypted in some way and delivered in that manner.

When the client contacts the server, the server pseudorandomly chooses a password from its copy of the password list, and sends an identifier (e.g.., an identification number, character or alphanumeric string) of that password to the client. The client looks up the identified password in its copy of the password list and sends the text of that password in the clear to the server. The server confirms that the client did indeed send the correct password and allows communications to begin. The server then marks the password as used and it is preferably not used again. However, passwords may be reused if so desired. Preferably, each session between communicators (e.g., between a client and a server) uses a different password, thereby enhancing security. Since the passwords are not reused, an eavesdropper cannot intercept a password and later use it. This scheme is very effective for managing connections between laptop or other remote computers and a dial-up server. However, the challenge and response authentication system is not limited to such uses. Any electronic communication between a plurality of communicators may be protected through this system.

Other embodiments and uses of the invention will be apparent to those skilled in the art from consideration of the specification and practice of the invention disclosed herein. The specification should be considered exemplary only, with the true scope and spirit of the invention indicated by the following claims.

I claim:

1. A password management system for communicating over a communications network comprising:

means for generating a password list, the password list comprised of a plurality of passwords;

means for providing the password list to at least a first party and a second party;

selecting means for selecting one of the passwords from the password list provided to the first party;

means for providing the second party with an identifier for the selected password;

means for looking up in the password list provided to the second party a second party password corresponding to the identifier; and means for confirming that the second party password is identical to the selected password.

2. A password management system for communicating over a communications network according to claim 1, wherein the means for providing the password list is a means other than a means for communicating over an electronic communications network.

3. A password management system for communicating over a communications network according to claim 1, further comprising means for encrypting a communication with the selected password.

4. A password management system for communicating over a communications network according to claim 1, wherein each of the passwords includes printable and unprintable characters.

5. A password management system for communicating over a communications network according to claim 1, wherein the selecting means comprises means for repeatedly selecting a new password from the password list after expiration of an interval of time.

6. A password management system for communicating over a communications network according to claim 5, wherein subsequently selected passwords are used for intervals of time, each interval of time being less than, approximately equal to, or greater than the interval of time for the previously selected password.

7. A password management system for communicating over a communications network according to claim 5, wherein the new password is a password that has not been previously used.

8. A password management system for communicating over a communications network according to claim 1, further comprising storing means for storing the password list provided to the first party.

9. A password management system for communicating over a communications network according to claim 8, wherein the storing means is comprised of a plurality of sublists.

10. A password management system for communicating over a communications network according to claim 9, wherein at least one of the sublists is comprised of available passwords.

11. A password management system for communicating over a communications network according to claim 1, wherein the means for generating a password list generates a plurality of password files for a plurality of communicators.

12. A password management system for communicating over a communications network according to claim 11, further comprising storing means for storing the password files.

13. A password management system for communicating over a communications network according to claim 1, wherein the means for generating a password list generates a new password list in response to predetermined criteria.

14. A password management system for communicating over a communications network according to claim 1, wherein the first party is a server and the second party is a client.

15. A password management system for communicating over a communications network comprising:
    means for providing a password list to at least a first party and a second party, the password list comprised of a plurality of passwords;
    means for selecting one of the passwords from the password list provided to the first party;
    means for providing the second party with an identifier for the selected password;
    means for looking up the password list provided to the second party a second party password corresponding to the identifier; and
    means for confirming that the second party password is identical to the selected password.

16. A password management system for communicating over a communications network according to claim 15, further comprising means for encrypting communications between at least the first party and the second party with the selected password.

17. A password management system for communicating over a communications network according to claim 15, further comprising means for selecting a new password after expiration of a time interval.

18. A challenge and response authentication system for communicating over a communications network comprising:
    means for generating a password list, the password list comprised of a plurality of passwords;
    means for providing the password list to at least a first party and a second party;
    selecting means for selecting one of the passwords from the password list provided to the first party;
    means for providing the second party with an identifier for the selected password;
    means for looking up in the password list provided to the second party a second party password corresponding to the identifier;
    means for communicating the second party password to the first party; and
    means for confirming that the second party password is identical to the selected password.

19. A challenge and response authentication system for communicating over a communications network according to claim 18, wherein the selected password is not reused.

20. A method for securing communications over a communications network comprising the steps of:
    generating a password list, the password list comprised of a plurality of passwords;
    providing the password list to at least a first party and a second party;
    selecting one of the passwords from the password list provided to the first party;
    providing the second party with an identifier for the selected password;
    looking up in the password list provided to the second party a second party password corresponding to the identifier; and
    confirming that the second party password is identical to the selected password.

21. A method for securing communications over a communications network according to claim 20, wherein the password list is not communicated over an electronic communications network.

22. A method for securing communications over a communications network according to claim 20, further comprising the step of encrypting a communication with the selected password.

23. A method for securing communications over a communications network according to claim 20, wherein each of the passwords includes printable and unprintable characters.

24. A method for securing communications over a communications network according to claim 20, wherein the step of selecting comprises repeatedly selecting a new password from the password list after expiration of an interval of time.

25. A method for securing communications over a communications network according to claim 24, wherein subsequently selected passwords are used for intervals of time, each interval of time being less than, approximately equal to, or greater than the interval of time for the previously selected password.

26. A method for securing communications over a communications network according to claim 24, wherein the new password is a password that has not been previously used.

27. A method for securing communications over a communications network according to claim 20, further comprising the step of storing the password list provided to the first party.

28. A method for securing communications over a communications network according to claim 27, wherein the password list provided to the first party is divided into a plurality of sublists.

29. A method for securing communications over a communications network according to claim 28, wherein at least one of the sublists is comprised of available passwords.

30. A method for securing communications over a communications network according to claim 20, wherein the step of generating a password list comprises the step of generating a plurality of password files for a plurality of communicators.

31. A method for securing communications over a communications network according to claim 30, further comprising the step of storing the password files.

32. A method for securing communications over a communications network according to claim 20, wherein the step of generating a password list comprises the step of generating a new password list in response to predetermined criteria.

33. A method for securing communications over a communications network according to claim 20, wherein the first party is a server and the second party is a client.

34. A method for securing communications over a communications network according to claim 20, further comprising the step of repeatedly selecting a new password from the password list provided to the first party after expiration of an interval of time.

35. A method for securing communications over a communications network according to claim 34, wherein subsequently selected passwords are used for intervals of time, each interval of time being less than, approximately equal to, or greater than the interval of time for the previously selected password.

36. A method for securing communications over a communications network comprising the steps of:

providing a password list to at least a first party and a second party, the password list comprised of a plurality of passwords;

selecting one of the passwords from the password list provided to the first party;

providing the second party with an identifier for the selected password;

looking up the password list provided to the second party a second party password corresponding to the identifier; and confirming that the second party password is identical to the selected password.

37. A method for securing communications over a communications network according to claim 36, further comprising the step of encrypting communications between at least the first party and the second party with the selected password.

38. A method for securing communications over a communications network according to claim 36, further comprising the step of selecting a new password from the password list provided to the first party after expiration of a time interval.

39. A method for securing communications over a communications network comprising the steps of:

generating a password list, the password list comprised of a plurality of passwords;

providing the password list to at least a first party and a second party;

selecting one of the passwords from the password list provided to the first party;

providing the second party with an identifier for the selected password;

looking up in the password list provided to the second party a second party password corresponding to the identifier;

communicating the second party password to the first party; and confirming that the second party password is identical to the selected password.

40. A method for securing communications over a communications network according to claim 39, wherein the selected password is not reused.

41. A method for securing communications over a communications network according to claim 39, further comprising the step of selecting a new password from the password list after expiration of a time interval.

* * * * *